(12) United States Patent
Mahesh et al.

(10) Patent No.: US 12,169,352 B2
(45) Date of Patent: Dec. 17, 2024

(54) REFLECTOR FOR A CAMERA ON A COMPUTING DEVICE WITH A CLOSABLE LID

(71) Applicant: Intel Corporation, Santa Clara, CA (US)

(72) Inventors: Gunnam Venkata Mahesh, Bengaluru (IN); Praveen Kashyap Ananta Bhat, Bangalore (IN); Tarakesava Reddy K, Telangana (IN); Phani Alaparthi, Bengaluru (IN)

(73) Assignee: Intel Corporation, Santa Clara, CA (US)

( * ) Notice: Subject to any disclaimer, the term of this patent is extended or adjusted under 35 U.S.C. 154(b) by 763 days.

(21) Appl. No.: 17/201,715

(22) Filed: Mar. 15, 2021

(65) Prior Publication Data

US 2021/0200070 A1    Jul. 1, 2021

(51) Int. Cl.
*G03B 19/12*    (2021.01)
*G03B 11/04*    (2021.01)
*G03B 17/17*    (2021.01)
*H04N 23/51*    (2023.01)
*H04N 23/55*    (2023.01)

(52) U.S. Cl.
CPC ............ *G03B 19/12* (2013.01); *G03B 11/043* (2013.01); *G03B 17/17* (2013.01); *H04N 23/51* (2023.01); *H04N 23/55* (2023.01)

(58) Field of Classification Search
CPC ...... G03B 19/12; G03B 11/043; G03B 17/17; G03B 17/04; G03B 29/00; H04N 23/51; H04N 23/55; H04N 23/57
See application file for complete search history.

(56) References Cited

U.S. PATENT DOCUMENTS

| 8,531,596 | B2* | 9/2013 | Tanida | H04N 23/54 |
| | | | | 348/376 |
| 10,069,960 | B2* | 9/2018 | Alameh | H04M 1/72454 |
| 10,412,281 | B2* | 9/2019 | Konttori | G03B 17/00 |
| 2008/0171571 | A1* | 7/2008 | Feil | H04N 1/00525 |
| | | | | 455/575.1 |
| 2009/0153726 | A1* | 6/2009 | Lim | H04N 23/57 |
| | | | | 348/360 |
| 2016/0065808 | A1* | 3/2016 | Eromäki | H04M 1/0214 |
| | | | | 348/373 |

FOREIGN PATENT DOCUMENTS

JP    2012155227 A    *    8/2012

* cited by examiner

*Primary Examiner* — Timothy J Henn
(74) *Attorney, Agent, or Firm* — Hanley, Flight & Zimmerman, LLC (57) ABSTRACT

A computing device with a closable lid and camera on the lid has a reflector arranged to use the camera while the lid of the computing device is closed.

23 Claims, 6 Drawing Sheets

REFLECTOR FOR A CAMERA ON A COMPUTING DEVICE WITH A CLOSABLE LID

BACKGROUND

Clam-shell style computing devices such as laptops typically have an upper lid hinged to a base or lower lid. A camera is usually provided on the upper lid so that when the upper lid is in an open position, the camera faces a user using the laptop and can be used for imaging applications such as facial recognition to authorize use of the laptop or user presence detection modes that automatically waken the laptop. The camera faces the same direction as the screen such that when the laptop is closed, the upper lid, and in turn the camera, faces the base so that the camera cannot be used. This is very inconvenient when the laptop is to remain closed but a user still desires to use the camera. This may occur when the laptop is placed in a dock for example. In this case, certain camera or visual-based applications cannot be used such as user presence detection, facial recognition, and so forth.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Furthermore, where considered appropriate, reference labels have been repeated among the figures to indicate the corresponding or analogous elements. In the figures.

DETAILED DESCRIPTION

One or more implementations are now described with reference to the enclosed figures. While specific configurations and arrangements are discussed, it should be understood that this is done for illustrative purposes only. Persons skilled in the relevant art will recognize that other configurations and arrangements may be employed without departing from the spirit and scope of the description. It will be apparent to those skilled in the relevant art that techniques and/or arrangements described herein also may be employed in a variety of other systems and applications other than what is described herein.

References in the specification to "one implementation", "an implementation", "an example implementation", etc., indicate that the implementation described may include a particular feature, structure, or characteristic, but every implementation may not necessarily include the particular feature, structure, or characteristic. Moreover, such phrases are not necessarily referring to the same implementation. Furthermore, when a particular feature, structure, or characteristic is described in connection with an implementation, it is submitted that it is within the knowledge of one skilled in the art to affect such feature, structure, or characteristic in connection with other implementations whether or not explicitly described herein.

Systems, devices, apparatuses, articles, computing devices, laptops, and methods are described below related to a reflector for a camera on a computing device with closable lid.

Since the camera on the upper lid of the computing device, or laptop, is inaccessible when the laptop is closed, a user that uses facial recognition to gain authorized access to the laptop often must first open the laptop, boot-up or wake up the laptop, use the face recognition, and then close the laptop to dock the laptop or physically place the laptop out of the way while connecting the laptop to a monitor for example. This wastes time and is inconvenient to the user.

Also, some computer vision technologies have "always on" modes that use the upper lid camera to detect the presence or absence of a user by detecting any part of a user's body, or wake-on-face when a user's face faces the camera, so that the computing device can automatically waken when the user presence or face is detected, or put to sleep after the user leaves the computing device. These applications cannot be used when the computing device is closed, such as when the computing device is docked.

Other camera-based applications that cannot be used with the on-board camera while the computing device is closed may include any video conferencing applications, performance enhancements that can record images while the user is not using the camera and in order to use captured image data to better train machine learning and neural network-based image applications to provide better quality images, such as with lighting, contrast, and so forth. "Always on" privacy and security applications also could control access to the computing device when an unknown user's face is detected by using the camera.

In order to use camera applications on a closed computing device, conventionally, the computing devices may be in communication with an external camera pointed toward a position of a user with a view to a monitor and access to a keyboard and mouse, all communicating with the computing device. Such external cameras, such as USB pluggable cameras, may be mounted on the monitor or near the laptop to plug into the laptop by using a wire. Wireless cameras are available as well. The external camera, however, is considered additional equipment, which also may include a separate power charge wire, mounting pieces and tools, a base to hold the camera, a travel camera case, and so forth, which all adds an extra cost and may be cumbersome, thereby another annoyance due to the need to carry the external camera and its equipment when carrying the laptop. The external camera also will require time to setup the camera in the correct position for use to capture a desired field of view (FOV) whenever the camera is being moved. Additional software also may be needed in order to adjust camera settings, for example lighting, contrast, and so forth, each time the camera is used in a new position, and may have at least some manual setting requirements. Also, external cameras often do not have robust security systems and can undesirably and unintentionally provide an easier unauthorized access point to hack into the computing device.

To resolve these issues, a clam-shaped computing device may have a base and an upper lid movably coupled to the base. The upper lid may have a screen and at least one camera with at least one lens facing the base when the upper lid is in a closed position relative to the base. A reflector of the computing device may be disposed to reflect light from an exterior of the computing device and to the lens while the upper lid is in the closed position so that the camera can capture images while the computing device is closed, and applications that need to use the image data of the camera can run while the computing device is closed. To accomplish this, the reflector may be in the form of a planar mirror (also referred to as a reflective surface herein) or prism disposed within a housing forming the base and in a position that is aligned with (or corresponds to) the position of the camera and lens, and in turn the optical axis of the camera, when the upper lid is in the closed position. To permit light to reach the reflector, an external, generally vertical sidewall and a generally horizontal upper wall of the housing facing the position of the camera when the upper lid is closed may have openings or a transparent wall (or transparent wall portion). By some alternatives, the sidewall and/or upper wall may even hold lenses that adjust the direction or other aspects of the light extending to or from the reflector in the housing of the base. In these cases, the reflector may include a planar mirror or prism with at least one diagonally positioned mirror that directs (or flips) light from being horizontal to upwardly (or vertically) directed toward the downwardly facing lens and camera on the closed upper lid of the computing device.

The reflector arrangement reduces power consumption and avoids privacy and security vulnerabilities by eliminating the need for the external camera and being able to either turn the computing device off or go into a sleep mode when the absence of a user is detected. The reflector also permits full-use or "always-on" operations at all times by enabling camera-based applications while the upper lid of the computing device is closed such as with facial recognition, wake-on-face, presence detection-based lock, and so forth. The closed-lid use of the camera also enables better performance enhancement optimization as well as privacy or security optimization since the computing device can use the camera at more times to train algorithms on image applications, even though the computing device may be closed. This all results in a better or enhanced user experience and adds value to the outcome and experience metrics (OxMs).

It will be appreciated that due to the change of direction in the light and change in aspects of the light caused by the reflector or any transparent wall or additional lenses covering the reflector on the base, the changes in the light may make it difficult for the camera on the upper lid to capture images of sufficient quality while the upper lid is closed and to be used by applications that require high quality images for analysis. Thus, advances in low quality image analysis by presence or facial detection applications enable the reflector to be able to work for its intended purpose despite the changes in the light. Often this is enabled by advances in image processing by vision companion chips and vision algorithms. Also, a combination of high quality reflectors, VGA or lower resolutions at lower camera frame rates, and/or trained artificial intelligence (AI) and machine language (ML) algorithms can assist with reducing undesirable losses in the light.

Figure 1:
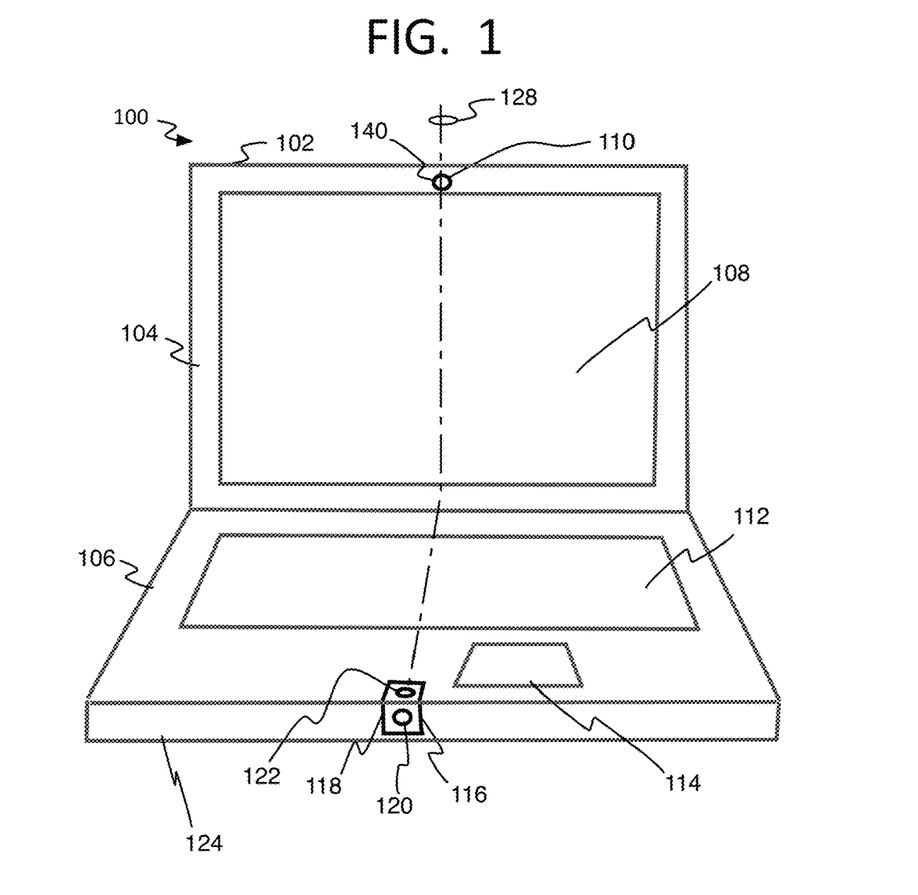
FIG. 1 is a front perspective view of an example computing device with a closeable lid shown in an open state and with a reflector according to at least one of the implementations herein.
Figure 2:
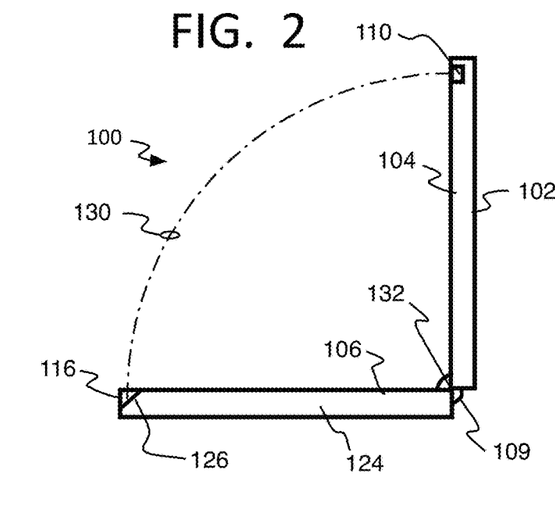
FIG. 2 is a side cross-sectional view of the example computing device of FIG. 1.

Referring now to FIGS. 1-2, an example computing device 100 is arranged to hold a reflector 126 as described herein. The computing device 100 may be any clam-shape style computing device with a camera positioned on one lid of the computing device that corresponds with, or is aligned to, a reflector on the other lid so that the camera can be used while the upper lid is in a closed position. Thus, the computing device may be a laptop. Herein, a laptop refers generally to any clam-shaped style computer whether a notebook, ultrabook, netbook, or other size of clam-shaped computer as long as an upper lid is hinged to a lower lid or base. Also, the computing device can be a tablet such as a convertible tablet or other computer tablet mounted on a detachable hard-shell or soft-shell clam-shaped cover, usually provided with a keyboard on the base or lower shell half. Also, this arrangement may be in the form of a smartphone (or flip-phone) or handheld computer gaming device that has a closing upper lid cover for example.

In this example, the computing device 100 has a body 102 with an upper lid 104 and a lower lid (or base) 106 movably attached to the upper lid 104 by a hinge or hinging structure 109 (shown in FIG. 2) so that the upper lid 104 covers the lower lid 106 (and vice-versa) when the upper lid is in a closed position. The upper lid 104 may have a display type of interface such as a screen 108 and a camera 140 with a camera lens 110 that is exposed on the upper lid 104. The base 106 may have user interfaces such as a keyboard 112 and a touch pad 114 or other mouse device so that the user can steer a cursor on the screen 108.

Figure 1A:
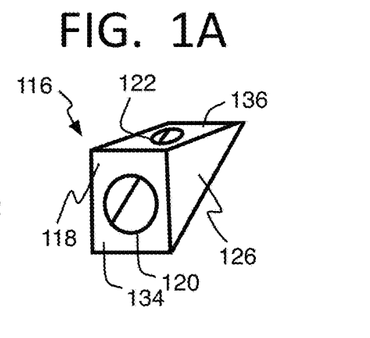
FIG. 1A is a close-up perspective view of an example reflector component according to at least one of the implementations herein.

Referring to FIGS. 1, 1A, and 2, the base 106 is formed by a housing 124, and a reflector component 116 may be disposed on, or at, the housing 124. Here the reflector component 116 includes at least two light access openings 120 and 122 as well as a reflector 126 (FIGS. 1A and 2) that may be a planar mirror, prism, or other reflecting part. By one form, as shown in FIG. 1A, the reflector component 116 may have a distinct body 118 that may be detachably mounted onto the housing 124 to provide access to the reflector 126 and may have a side wall 134 with an opening 120 and an upper wall 136 with an opening 122. The reflector component 116 may be detachable for repair, replacement, and/or updating of the reflector 126. When the reflector component 116 is detachable, the reflector component 116 may be mounted on the housing by tight fit within a three-sided slot on the housing 124 for example, magnetism, snap-fit, connector, and so forth. By another form, the reflector component 116 is separately manufactured but then permanently mounted on the housing 124. It also will be appreciated that either the side wall 134 or the upper wall 136 may form the reflector component 116 with the reflector 126, rather than both the side wall 134 and upper wall 136 as shown. In this latter case, the housing 124 may integrally provide the other hole and provide a four-sided slot for receiving the reflector component. Otherwise, the reflector component is integrally formed with the housing 124 such that openings 120 and 122 are formed on walls of the housing 124 without distinction of walls forming the openings 120 and 122.

While the upper lid 104 is in an open position as shown on FIGS. 1-2, the camera lens 110 will usually face a user using the computing device 100, and the computing device 100 may operate as normal and as typically used by a user, and without any limitations.

Figure 6:
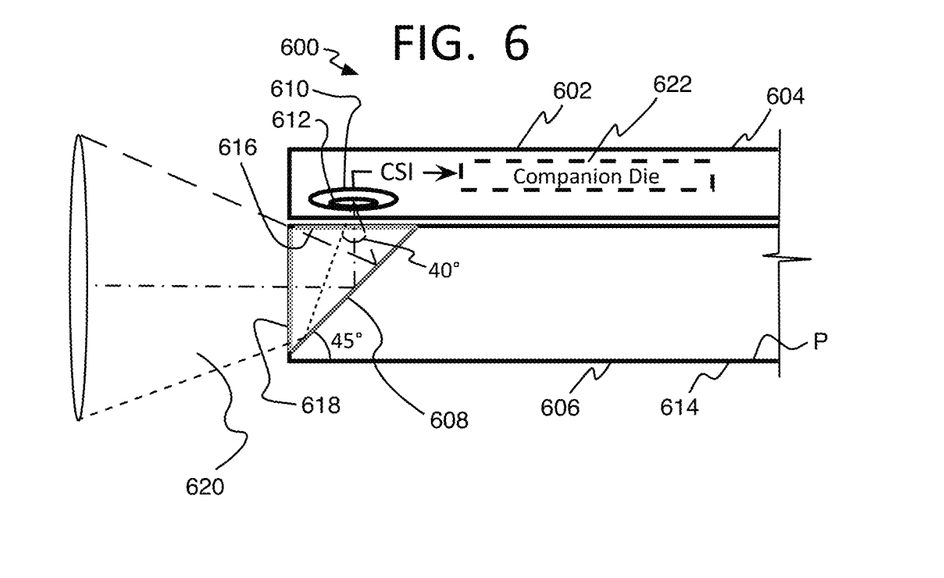
FIG. 6 is a close-up side cross-sectional view of a planar reflector on a computing device with a closable lid according to at least one of the implementations herein.
Figure 7:
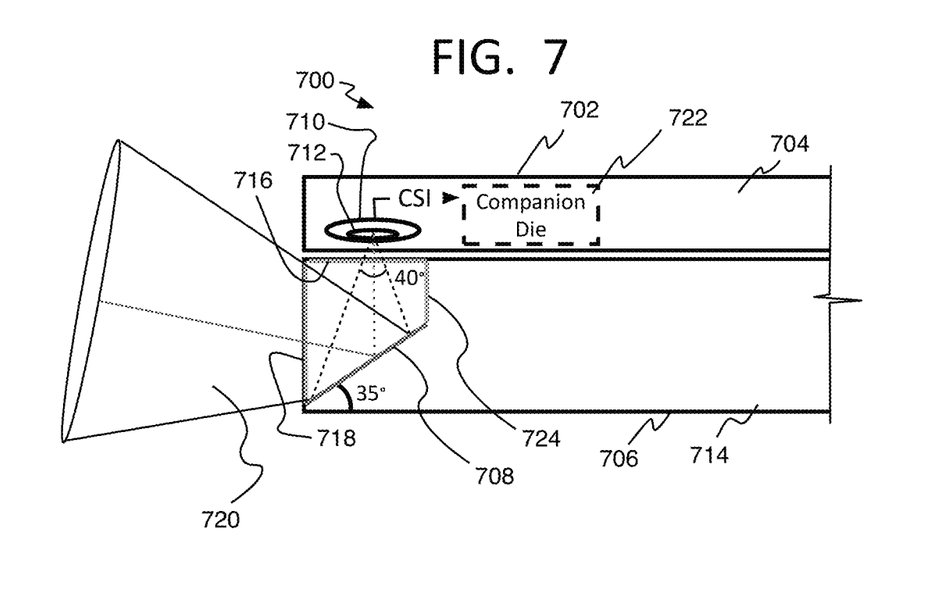
FIG. 7 is a close-up side cross-sectional view of another planar reflector on a computing device with a closable lid according to at least one of the implementations herein.
Figure 8:
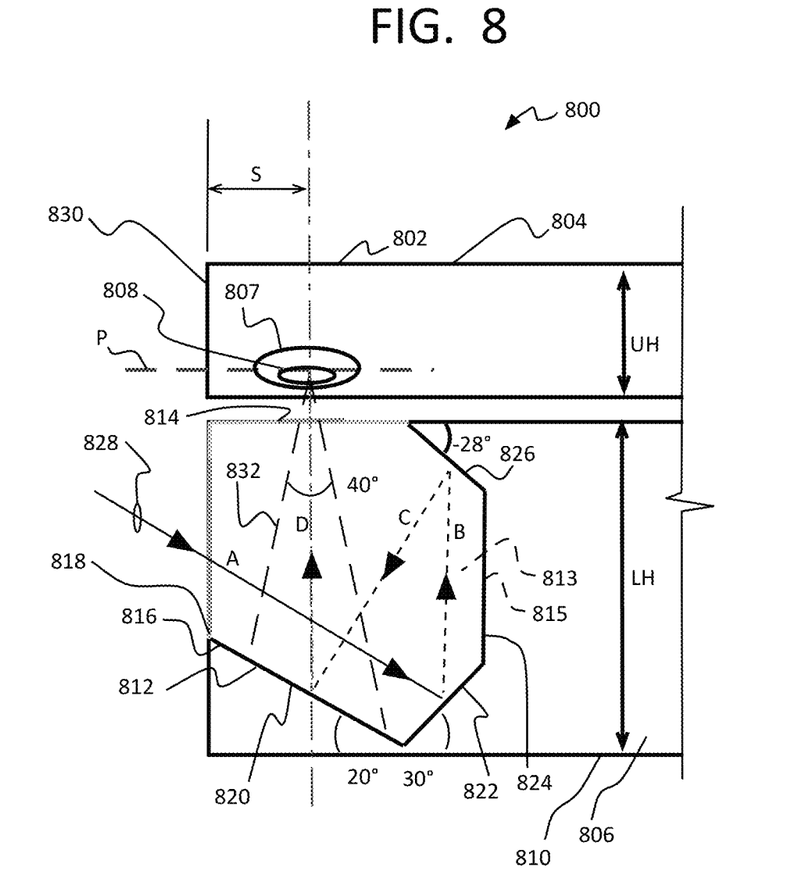
FIG. 8 is a close-up side cross-sectional view of a prism reflector on a computing device with a closable lid according to at least one of the implementations herein.

The reflector component 116 is positioned on the housing 124 to align or correspond laterally (side-to-side) with the camera lens 110 from a front view of the computing device 100 as shown by line 128 (FIG. 1), and aligned axially with the camera lens 110 as a distance from a hinge point 132 of the computing device 100 as shown by the circular arc line 130 in FIG. 2. With this arrangement, the camera lens 110 is aligned to receive light from the reflector 126 when the upper lid 104 is in a closed position, which is shown in FIGS. 6-8 below.

It will be appreciated that while computing device 100 only shows a single camera 140, and lens 110, and corresponding reflector 126, alternative arrangements could be used where a single clam-shaped computing device may have multiple separate camera-reflector alignment pairs that can be used when the upper lid is closed and multiple spaced cameras are on the upper lid. As another example, multiple cameras could be spaced close together on the upper lid to align with a same shared single reflector on the base.

Figure 3:
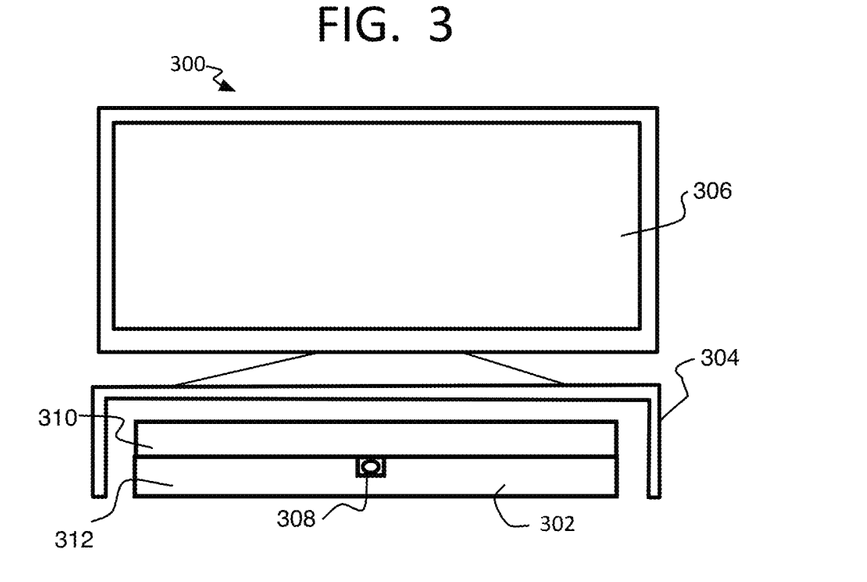
FIG. 3 is a front elevational view of an example computing device with a closeable lid shown in a closed state in a dock with a monitor and with a reflector according to at least one of the implementations herein.

Referring to FIG. 3, and with the disclosed reflector, the camera on the computing device in a closed state may be used in many different setups. For example, a setup or desk arrangement 300 may have a dock 304 placed on a desk, table, or other convenient surface and may hold a monitor 306 above the dock 304. A computing device 302 in a closed state may be placed under the dock 304 and in turn under the monitor 306. The computing device 302 may have an upper lid 310 with a camera (not shown) in a closed position and a base 312 with a reflector component 308 as with reflector component 116. By one form, the dock 304 may have connectors that connect to the computing device while a separate dock connector connects, by wire or wirelessly, to the monitor to thereby interconnect the monitor and computing device 302. By another form, the dock 306 simply holds the monitor 306 conveniently above the computing device 302, and the computing device 302 connects directly to the monitor 306 through wires or wirelessly. Wireless docking may be referred to as "virtual" docking herein. In either way, both the monitor and camera via the reflector component 308 faces a user.

Figure 4:
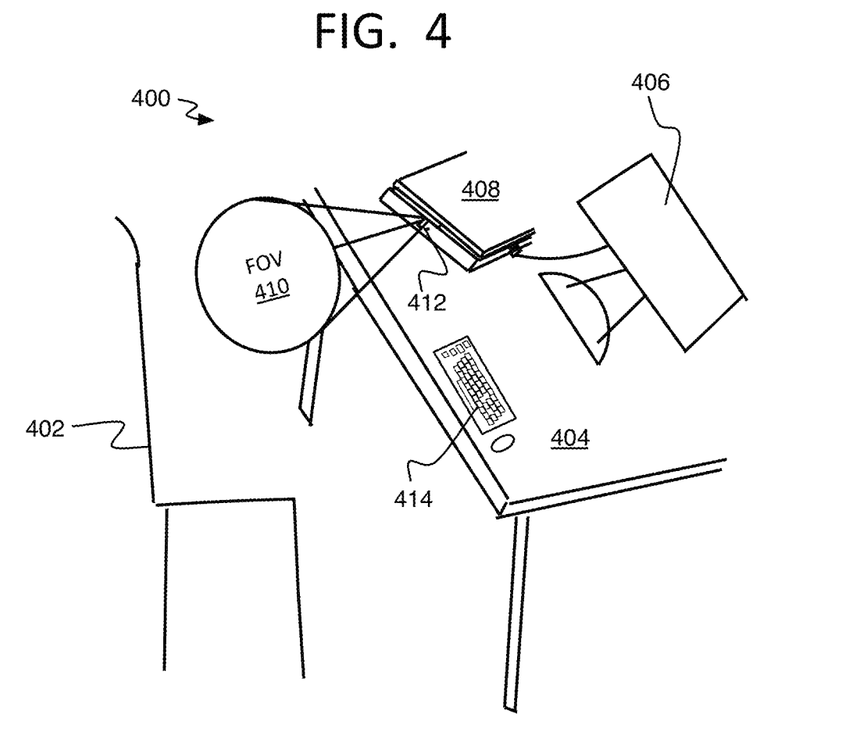
FIG. 4 is a rough perspective view of a closed computing device with a closeable lid and docked to a monitor and with a reflector according to at least one of the implementations herein.

Referring to FIG. 4, in another alternative setup 400, the computing device 408 is positioned on a desk or table 404 off to the side of the monitor 406. Here the computing device is shown to be connected directly to the monitor 406 by a wire. The computing 408 still is positioned to face a user that would sit in a chair 402 for example, and therefore within a field of view (FOV) cone 410 of the camera and as extending from the reflector component 412. Interfaces such as a keyboard and mouse 414 may be provided for the user as well.

Figure 5:
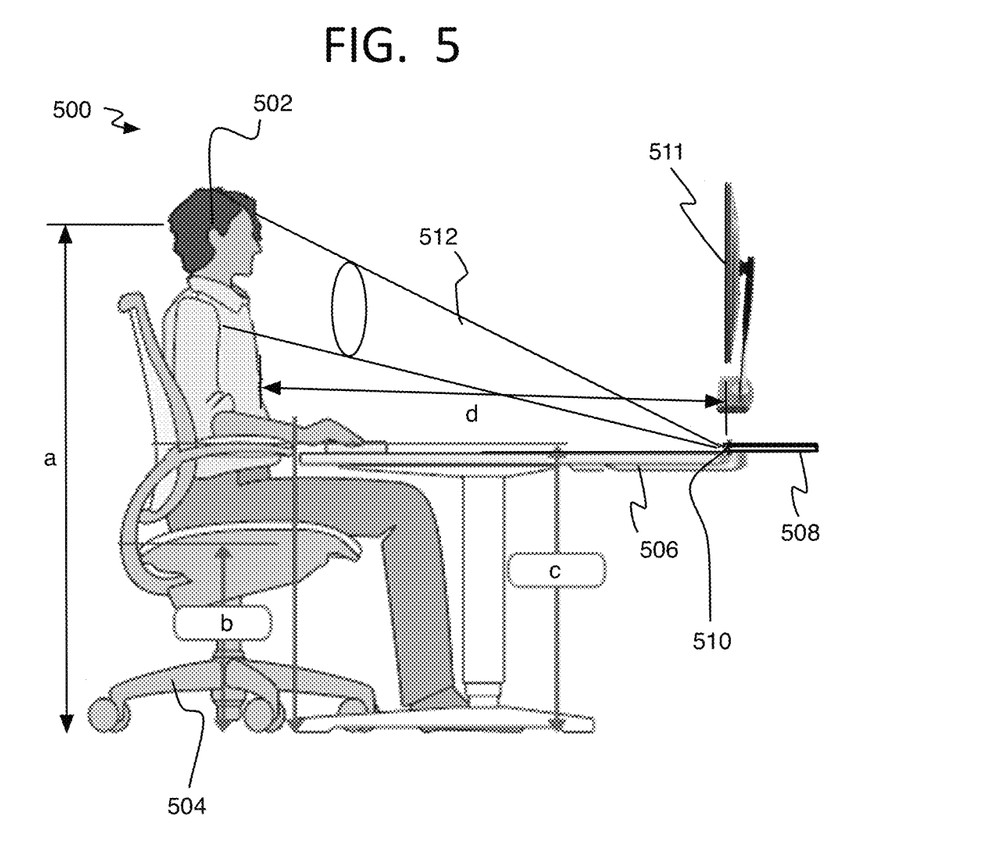
FIG. 5 is a side elevation view of a desk with a closed computing device with a closeable lid and docked to a monitor and with a reflector according to at least one of the implementations herein.

Referring to FIG. 5, in yet another setup 500, a user 502 is sitting in a chair 504 in front of a table or desk 506. A computing device 508 is on the desk and either under or next to a monitor 511. A FOV 512 of the camera and extending from the reflector of a reflector component 510 on the base of the computing device 508 may be defined and intentionally located at a certain position and orientation. The positioning of the FOV 512 depends on both the arrangement of the reflector component 510 itself and the position of the computing device 508, and in turn the position of the reflector component 510 relative to the position of the user 502. Thus, when the computing device 508 is placed too close or too far from the user 502, the user's face may be outside of the camera FOV 512. In order to better ensure a user's face is within the FOV cone 512, the reflector component 510 can be arranged so that the typical distance d between the reflector component and the user's face will place the user's face within the FOV 512. This also may depend on the typical face height 'a' relative to a desk (or elbow) height 'c' and chair height 'b'. By one form, d is about 0.5 to 1.0 meters but may be other desirable distances. Alternatively, an authorization or log-in application on the computing device may instruct a user to look towards the reflector on the computing device. The distance d also may be adjusted by the angles of the reflector as described below. This, however, may depend on the application. For example, user presence detection may not always require a user's face to appear in the FOV, and any body parts such as shoulders, forearms, chest, and so forth, will suffice. Authenticated access to the system, on the other hand, very well may require the facial recognition.

Referring to FIG. 6, a computing device 600 may be a closed laptop and provides an example reflector 608. The laptop 600 may have a body 602 with an upper lid 604 and a lower lid or base 606. The upper lid 604 may have a camera 610 with a lens 612 that points downward when the laptop 600 is a in a closed state (the upper lid 604 is in a closed position) as shown. The base 606 has a housing 614 that holds the reflector 608 in front of a light-accessible upper wall 616 facing the lens 612 and a light accessible front or side wall 618 to permit light from exterior of the laptop 600 to reach the reflector 608 when the laptop is in the closed state. This permits a FOV cone 620 of the camera to extend from the camera lens, through the upper wall 616, to the reflector, and then bend to extend through the front wall 618. The camera 610 then is enabled to make images from light received within the bent camera FOV.

In this example, the reflector 608 includes at least one mirror or prism with one or more reflective surfaces fixed in certain angles to alter the direction of the traveling light. On a smooth and reflective surface, light will reflect from the surface at the same angle from normal relative to the reflective surface, as the incidence angle. Reflected rays will be in the same plane as the incident rays. Thus, it is possible to determine the fixed angles to set the mirrors for example to set a FOV at a certain angle. In the present example, an FOV vertex angle is set at about 40 degrees. The reflector 608 is a single planar reflective diagonal mirror here positioned at about 45 degrees from horizontal (or more particularly, from a generally extending plane P formed by the computing device 600 and any computing device herein). This angle is sufficient to generally capture a user head and upper body using the computing device when the FOV vertex angle is about 40 degrees as mentioned. By other forms, an about 60 degree FOV vertex angle can be used with a mirror at about 66 degrees. This angle may be used so that substantially all of the diameter of the FOV intersects the reflector and is bent to extend out of the computing device 600 through the side wall 618. It will be understood that both the camera FOV vertex angle and angle between the reflector and plane P may be different depending on the formfactors of the computing device 600 being used.

Computing device 600 also is shown with a companion die 622 connected to the camera 610 via a camera serial interface (CSI) or other adequate pathway connection. A specific function companion die or circuit 622 may be vision companion dies or vision sensing controllers used to perform image processing tasks more efficiently with reduced computations and reduced power consumption better than a CPU. The die 622 may be located on the upper lid 604 near the camera but could be placed anywhere on the computing device including on the base 606. The die 622 may include a single processor chip or many chips, such as with a system on a chip (SoC). The die may be or have a graphics accelerator. Such dies may monitor the cameras, perform computations, such as with one or more multiple-accumulate circuits (MACs) to perform machine learning or neural network computations. The companion die 622 also may have sufficient memory to perform such computations. These may be performed for object segmentation, face or object detection, depth map generation, model generation, image enhancement, and other applications whether or not disclosed herein. For a number of applications, the use of the companion die 622 enables adequate results from image processing with lower quality images captured through the reflector.

Referring to FIG. 7, a computing device 700 has a similar setup as computing device 600 and is numbered similarly so that the description does not need to be repeated. Here, however, the reflector is disposed at 35 degree which results in the camera FOV 720 extending upward from horizontal as it extends outward from the housing 714. This may be used to better aim the FOV 720 generally upward towards a user's face as the user is positioned in front of the computing device 700. A support wall 724 may be used to hold the mirror of the reflector 708 if desired.

Referring to FIG. 8, a computing device 800 has a prism reflector 812. Specifically, computing device 800 has a clam-shell shaped body 802 with an upper lid 804 and a lower lid 806. The upper lid 804 has a thickness UH, which may be about 3 mm in one example. A camera 807 has a lens 808 on the upper lid 804 that points toward the base 806 when the upper lid 804 is in a closed position as shown. Both the camera lens (and particularly the optical axis of the camera) and the center of the opening 814 may be aligned such as by a distance 'S' from a front surface 830 of the chasis (or body) 802 (whether on the upper lid, base, or both) as shown, by one example.

The base 806 may have a housing 810 with a reflector component 816 that may or may not be detachable from the housing 810 and may hold the prism reflector 812. The reflector component 816 may have at least an upper wall opening 814 on the housing 810 that is positioned to face the camera lens 808, and a side wall opening 818 to permit light into the reflector component 816 and to reach the reflector 812.

In the present example, the reflector 812 is a prism formed of four or more planar surfaces herein including at least mirror surfaces 820, 822, and 826, while surface 824 may or may not be mirrored. With this arrangement, a light ray 828 will be directed into segments A, B, C, and D, in that order, to bend the light entering the reflector component 816 from the side wall opening 818 and upward through the opening 814 and toward the camera lens 808 via a multi-segment pathway. A prism, whether providing two or more reflections such as four as shown or three by a pentaprism, may be used in order to avoid rotating the image in certain ways, such as left and right, or up and down, when captured by the camera. This may be desired when the camera requires an image to have a certain orientation (downward in the image must be on a bottom side of the camera sensors for example). In other forms, camera and/or vision sensing controls or algorithms can be configured to handle the flipping of the images to a desired orientation.

By one option, the prism may be formed of a solid piece prism 813 such as of glass where surfaces 820, 822, 824, and 826 are outer surfaces of the prism 813 with at least two or three of the surfaces coated with a reflective material such as silver, aluminum and so forth. By other forms, simply having a glass prism 813 being held in an open space surrounded by another material such as air in the housing 810 may be sufficient to bend the light within the prism and toward the camera lens. By yet other options, a prism 815 is formed of a pentamirror (or other number of mirrors) formed of separate planar mirror plates facing inward.

By one example form, in order to center rays 828 at about a user's face according to setup 500 (FIG. 5) with a 1 meter distance to the user and other form factors, and direct the light rays 828 to the camera, angles of the mirrors (or prism surfaces) can be determined. Thus, a laptop considered to have thin and light laptop (size) form factors where UH is about 3 mm, and LH is about 7.5 mm, and where the camera lens 808 has about a 40° vertex angle for an FOV 832, mirror surface 820 may be set at 20° from horizontal P as defined by the computing device, mirror surface 822 may set at 30° from horizontal P, and mirror surface 826 may be set at −28° from horizontal P.

Figure 9:
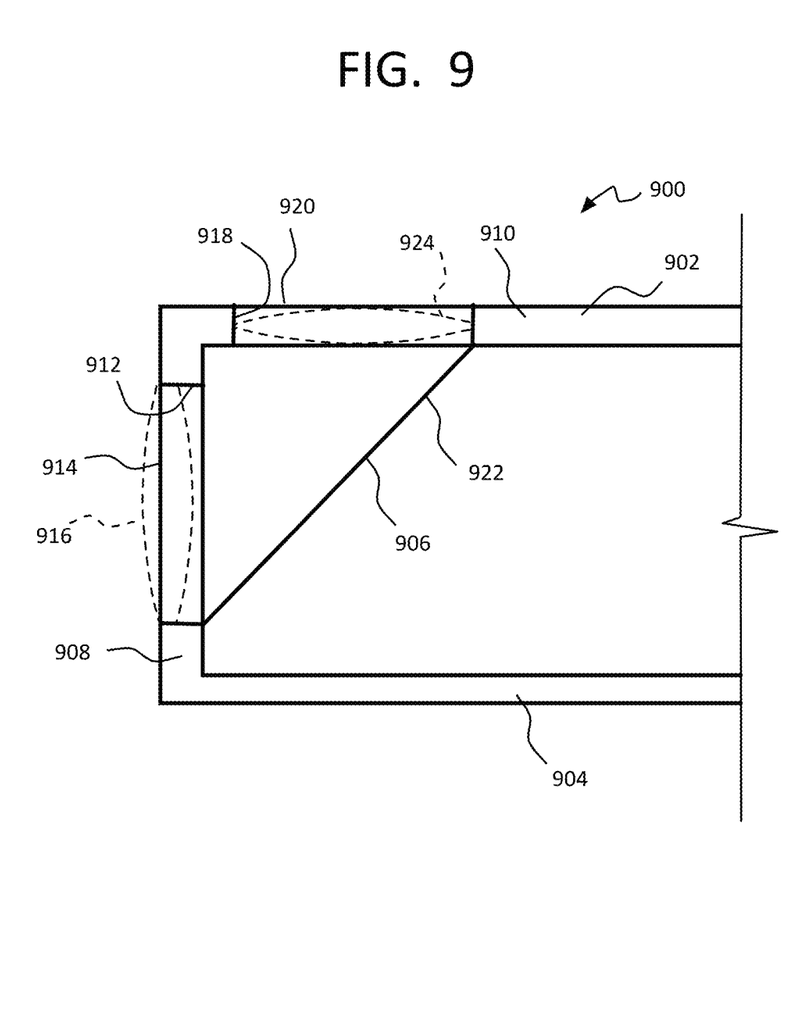
FIG. 9 is a close-up side cross-sectional view of a housing with a reflector on a computing device with a closable lid according to at least one of the implementations herein.

Referring to FIG. 9, a computing device 900 has a body 902 forming a base or lower lid of the computing device 900 and formed by a housing 904. The housing 904 may hold a reflector 906 at least generally covered by a side wall 908 and an upper wall 910. The reflector 906 receives light through an opening 912 on the side wall 908 and bends the light toward and through an opening 918 on the upper wall 910 and in turn, toward a camera on an upper lid of the computing device 900. The reflector 906 is shown here to be at least one planar mirror 922, although it could be a prism arrangement or other light directing arrangement as described herein. The mirror 922 may have a reflective surface formed substantially planar or may be at least partly concave, convex, or both in order to direct light or control other aspects of the light such as its diffusion, cohesiveness, intensity, reflectivity and so forth.

Also, at least one of the openings 912 and 918 could simply be holes respectively in the side wall 908 and upper wall 910, but could alternatively hold a transparent wall portion 914 or 920 formed of glass, plastic, or other at least partially transparent material, to protect the reflector 906. Otherwise, at least one of the openings 912 and 918 also could provide optic modifiers 916 or 924 such as many different types of lenses such as wide-angle, fisheye, and so forth depending on the application that is using the camera, the form factors such as distance to a user to be controlled, and the desired characteristics of the image data to be captured.

Whether in planar form or prism form, one or more mirrors of the reflector may be mounted on the housing by known methods such as by using mirrors with a substrate layer that forms the support and a reflective layer is placed over the substrate layer. In this example, the substrate layer (or support) may be made of molded plastic or metal whether molded as one piece with the housing (or chasis) or molded separately, and whether formed to be detachable from the housing or not. For plastics, such molding may include injection, blow, compression, film, insert, gas assist, rotational, structural foam or thermofoam molding, or other processes, such as those that use memory composite material for example. Metal support or substrate generation may including any rolling, extrusion, press braking, stamping, forging, and/or casting to name a few examples.

By another example, micro-painting may be used where the mirrors are formed of a main substrate material such as plastic or metal, and the mirror is formed of a reflective paint, such as silver, aluminum, and so forth, that is sprayed or otherwise deposited onto the substrate to form the mirror. By other forms, a layer of glass is provided with such reflective material forming a backing of the mirror with the reflective materials mentioned and whether painted, sprayed, or otherwise deposited on the glass layer. Otherwise, the processes for making the mirrors and supports for the mirrors, when provided, is not particularly limited. Also as mentioned, the reflector may be formed of a separate reflector component that may or may not be detachable from the base housing, or may be integrally formed with the base housing.

With these arrangements, the camera and image processing applications on the computing device can continue to operate even though the upper lid is in a closed position and the camera is facing the base of the computing device. Thus, user presence detection and scene change detection applications can continue to capture the user presence and the scene changes through the incoming light from the reflector arrangement. By one form, one or more visual sensing controllers, in the form of one or more companion dies for example, may perform in an always-on mode in the background and while the camera continues to capture images to continue to detect the user, or even specific body parts of the user such as a face, chest, hands, forearms, and so forth. The presence detection (or detected absence), based at least partly on the distance from the user, may waken and signal processors on the computing device to take appropriate action.

The arrangements described above enable background running applications that perform user presence and absence detection so that the computing device can be locked when the user walks away from the computing device to remove vulnerabilities such as a privacy breach even though the computing device upper lid is in a closed position. Thus, when the absence of the user is detected while the computing device is closed, the computing device can even turn off a secondary monitor networked to the closed computing device and lock the system, and even if the user forgets to lock the system. When the presence and absence detection is being performed with visual recognition for personal identification and authorization while the lid is closed on the computing device, closed-lid face recognition and authentication can now be performed alone or while accompanying external fingerprint sensor pads or keyboards that are networked to the closed computing device in order to provide such authorization.

In these image processing implementations or any other applications mentioned herein, features described herein may be undertaken in response to instructions provided by one or more computer program products. Such program products may include signal bearing media providing instructions that, when executed by, for example, a processor, may provide the functionality described herein. The computer program products may be provided in any form of one or more machine-readable media. Thus, for example, a processor including one or more processor core(s) may undertake one or more features described herein in response to program code and/or instructions or instruction sets conveyed to the processor by one or more machine-readable media. In general, a machine-readable medium may convey software in the form of program code and/or instructions or instruction sets that may cause any of the devices and/or systems described herein to implement at least portions of the features described herein. As mentioned previously, in another form, a non-transitory article, such as a non-transitory computer readable medium, may be used with any of the examples mentioned above or other examples except that it does not include a transitory signal per se. It does include those elements other than a signal per se that may hold data temporarily in a "transitory" fashion such as RAM and so forth.

As used in any implementation described herein, the term "module" refers to any combination of software logic, firmware logic and/or hardware logic configured to provide the functionality described herein. The software may be embodied as a software package, code and/or instruction set or instructions, and "hardware", as used in any implementation described herein, may include, for example, singly or in any combination, hardwired circuitry, programmable circuitry, state machine circuitry, and/or firmware that stores instructions executed by programmable circuitry. The modules may, collectively or individually, be embodied as circuitry that forms part of a larger system, for example, an integrated circuit (IC), system on-chip (SoC), and so forth. For example, a module may be embodied in logic circuitry for the implementation via software, firmware, or hardware of the coding systems discussed herein.

As used in any implementation described herein, the term "logic unit" refers to any combination of firmware logic and/or hardware logic configured to provide the functionality described herein. The logic units may, collectively or individually, be embodied as circuitry that forms part of a larger system, for example, an integrated circuit (IC), system on-chip (SoC), and so forth. For example, a logic unit may be embodied in logic circuitry for the implementation firmware or hardware of the coding systems discussed herein. One of ordinary skill in the art will appreciate that operations performed by hardware and/or firmware may alternatively be implemented via software, which may be embodied as a software package, code and/or instruction set or instructions, and also appreciate that logic unit may also utilize a portion of software to implement its functionality.

As used in any implementation described herein, the term "component" may refer to a module or to a logic unit, as these terms are described above. Accordingly, the term "component" may refer to any combination of software logic, firmware logic, and/or hardware logic configured to provide the functionality described herein. For example, one of ordinary skill in the art will appreciate that operations performed by hardware and/or firmware may alternatively be implemented via a software module, which may be embodied as a software package, code and/or instruction set, and also appreciate that a logic unit may also utilize a portion of software to implement its functionality.

Various forms of the devices and processes described herein may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

The following examples pertain to additional implementations.

By an example one or more first implementations, a computing device comprises a base; an upper lid movably coupled to the base and having a screen and at least one camera with at least one lens facing the base when the upper lid is in a closed position relative to the base; and a reflector of the computing device being disposed to reflect light from an exterior of the computing device and to the lens while the upper lid is in the closed position.

By one or more second implementation, and further to the first implementation, wherein the base comprises a housing and the reflector is disposed within the housing.

By one or more third implementations, and further to the first implementation, wherein the base comprises a housing and the reflector is disposed within the housing, and wherein the base comprises an exterior wall with an empty opening to permit light to reach the reflector.

By one or more fourth implementations, and further to the first implementation, wherein the base comprises a housing and the reflector is disposed within the housing, and wherein the base comprises an exterior transparent wall to permit light to reach the reflector.

By one or more fifth implementations, and further to any of the first to fourth implementation, wherein the base generally forms a plane, and wherein the reflector is disposed in a diagonal position relative to the plane to receive light initially and generally parallel to the plane and to direct the light from the base generally perpendicular to the plane to extend toward the lens when the upper lid is in the closed position.

By one or more sixth implementations, and further to any of the first to fifth implementation, wherein the reflector comprises a single planar reflective surface.

By one or more seventh implementations, and further to any of the first to sixth implementation, wherein the reflector comprises a prism with multiple reflective surfaces.

By one or more eighth implementations, and further to any of the first to sixth implementation, wherein the reflector comprises a prism with multiple reflective surfaces, and wherein the reflector is a one piece, at least partially transparent, solid prism wherein exterior walls of the prism act as mirrors.

By one or more ninth implementations, and further to any of the first to sixth implementation, wherein the reflector comprises a prism with multiple reflective surfaces, and wherein the prism is hollow and is formed of multiple inwardly facing planar reflective surfaces.

By one or more tenth implementations, and further to any of the first to ninth implementation, wherein the device comprises at least one companion die communicatively coupled to the camera and being arranged to perform image processing on images captured by the camera, wherein the images are captured by the camera while the upper lid is in the closed position and while the camera faces the base.

By one or more eleventh implementations, a reflector of a computing device comprises at least one reflective surface disposed at a base of the computing device, wherein the computing device comprises an upper lid coupled to the base and having a screen and camera facing the base when the upper lid is in a closed position, and wherein the at least one reflective surface is disposed at the base in a position to reflect light from an exterior of the computing device and to be directed toward the camera while the upper lid is in the closed position.

By one or more twelfth implementations, and further to the eleventh implementation, wherein the reflector being disposed within the base, wherein the base comprises a housing with walls with at least two openings to permit light to reach the reflector within the housing.

By one or more thirteenth implementations, and further to the eleventh implementation, wherein the reflector being disposed within the base, wherein the base comprises a housing with walls with at least two openings to permit light to reach the reflector within the housing, and wherein the openings are maintained uncovered while the upper lid is in the closed state.

By one or more fourteenth implementations, and further to the eleventh implementation, wherein the reflector being disposed within the base, wherein the base comprises a housing with walls with at least two openings to permit light to reach the reflector within the housing, and wherein at least one of the openings is at least partially covered by, or filled with, an at least partially transparent material.

By one or more fifteenth implementations, and further to the eleventh implementation, wherein the reflector being disposed within the base, wherein the base comprises a housing with walls with at least two openings to permit light to reach the reflector within the housing, and wherein at least one of the openings holds at least one lens.

By one or more sixteenth implementations, and further to any of the eleventh to fifteenth implementation, wherein the at least one reflective surface is at least partially concave or convex.

By one or more seventeenth implementations, and further to any of the eleventh to sixteenth implementation, wherein the computing device comprises at least one specific function image processing circuit communicatively coupled to the camera and being arranged to perform image processing on images captured by the camera, wherein the images are captured by the camera while the upper lid is in the closed position and while the camera faces the base.

By one or more eighteenth implementations, and further to any of the eleventh to sixteenth implementation, wherein the computing device comprises at least one specific function image processing circuit communicatively coupled to the camera and being arranged to perform image processing on images captured by the camera, wherein the images are captured by the camera while the upper lid is in the closed position and while the camera faces the base, and wherein the circuit performs operations of at least one of facial recognition, visual-based user presence detection, and visual-based user absence detection while the upper lid is in the closed position.

By one or more nineteenth implementations, a camera system comprises a computing device comprising a base; an upper lid coupled to the base and having a screen and at least one camera with at least one lens facing the base when the upper lid is in a closed position relative to the base; and a reflector of the computing device being disposed to reflect light from an exterior of the computing device and to the lens while the upper lid is in the closed position; and at least one processor communicatively coupled to the at least one camera and being arranged to activate the camera to capture images while the upper lid is in the closed position.

By one or more twentieth implementations, and further to the nineteenth implementation, wherein the system comprises comprising a reflector component having the reflector and walls with at least one opening to permit light to reach the reflector, wherein the reflector component is detachably mounted on the base.

By one or more twenty-first implementations, and further to the nineteenth or twentieth implementation, wherein the reflector comprises a substantially planar reflective surface.

By one or more twenty-second implementations, and further to the nineteenth or twentieth implementation, wherein the reflector comprises a prism formed of multiple reflective surfaces.

By one or more twenty-third implementations, and further to any of the nineteenth to the twenty-second implementation, wherein the reflector is disposed on the base to redirect light from exterior of a front face of the computing device and to the lens of the camera on the upper lid while the upper lid is the closed position.

By one or more twenty-fourth implementations, and further to any of the nineteenth to the twenty-third implementation, wherein the base comprises a housing with walls forming at least one opening that permit light to reach the reflector.

By one or more twenty-fifth implementations, and further to any of the nineteenth to the twenty-fourth implementation, wherein the computing device comprises at least one specific function image processing circuit communicatively coupled to the camera and being arranged to perform image processing on images captured by the camera, wherein the images are captured by the camera while the upper lid is in the closed position and while the camera faces the base.

In one or more twenty-sixth implementations, a device or system includes a memory and a processor to perform a method according to any one of the above implementations.

In one or more twenty-seventh implementations, at least one machine readable medium includes a plurality of instructions that in response to being executed on a computing device, cause the computing device to perform a method according to any one of the above implementations.

In one or more twenty-eighth implementations, an apparatus may include means for performing a method according to any one of the above implementations.

The above examples may include specific combination of features. However, the above examples are not limited in this regard and, in various implementations, the above examples may include undertaking only a subset of such features, undertaking a different order of such features, undertaking a different combination of such features, and/or undertaking additional features than those features explicitly listed. For example, all features described with respect to any example methods herein may be implemented with respect to any example apparatus, example systems, and/or example articles, and vice versa.

What is claimed is:

1. A computing device, comprising:
   a base;
   an upper lid movably coupled to the base and having a screen and at least one camera with at least one lens facing the base when the upper lid is in a closed position relative to the base; and
   a reflector of the computing device being disposed in a diagonal position relative to a plane of the base to receive light from an exterior of the computing device initially and generally parallel to the plane and to reflect the light from the base generally perpendicular to the plane to direct the light towards the lens while the upper lid is in the closed position.

2. The computing device of claim 1, wherein the base includes a housing and the reflector is disposed within the housing.

3. The computing device of claim 2, wherein the base includes an exterior wall with an empty opening to permit light to reach the reflector.

4. The computing device of claim 2 wherein the base includes an exterior transparent wall to permit light to reach the reflector.

5. The computing device of claim 1, wherein the reflector includes a single planar reflective surface.

6. The computing device of claim 1, wherein the reflector includes a prism with multiple reflective surfaces.

7. The computing device of claim 6, wherein the reflector is a one piece, at least partially transparent, solid prism, wherein exterior walls of the prism act as reflective surfaces.

8. The computing device of claim 6, wherein the prism is hollow and is formed of multiple inwardly facing planar reflective surfaces.

9. The computing device of claim 1, including at least one companion die communicatively coupled to the camera and arranged to perform image processing on images captured by the camera, wherein the images are captured by the camera while the upper lid is in the closed position and while the camera faces the base.

10. A reflector of a computing device, the reflector comprising:
    at least one reflective surface disposed at a base of the computing device, wherein the computing device includes an upper lid coupled to the base and having a screen and camera facing the base when the upper lid is in a closed position, and
    wherein the at least one reflective surface is disposed in a diagonal position relative to a plane of the base to receive light from an exterior of the computing device initially and generally parallel to the plane and to reflect the light from the base generally perpendicular to the plane to cause the light to be directed toward the camera while the upper lid is in the closed position.

11. The reflector of claim 10 being disposed within the base, wherein the base includes a housing with walls with at least two openings to permit light to reach the reflector within the housing.

12. The reflector of claim 11, wherein the openings are formed by unfilled holes in the walls of the housing.

13. The reflector of claim 11, wherein at least one of the openings is at least partially covered by, or filled with, an at least partially transparent material.

14. The reflector of claim 11, wherein at least one of the openings holds at least one lens.

15. The reflector of claim 10, wherein the at least one reflective surface is at least partially concave or convex.

16. The reflector of claim 10, wherein the computing device includes at least one image processing circuit communicatively coupled to the camera and arranged to perform image processing on images captured by the camera, wherein the images are captured by the camera while the upper lid is in the closed position and while the camera faces the base.

17. The reflector of claim 16, wherein the image processing circuit performs operations associated with at least one of facial recognition, visual-based user presence detection, or visual-based user absence detection while the upper lid is in the closed position.

18. A camera system comprising:
a computing device, comprising:
a base;
an upper lid coupled to the base and having a screen and at least one camera with at least one lens facing the base when the upper lid is in a closed position relative to the base;
a reflector of the computing device being disposed in a diagonal position relative to a plane of the base to receive light from an exterior of the computing device initially and generally parallel to the plane and to reflect the light from the base generally perpendicular to the plane to direct the light towards the lens while the upper lid is in the closed position; and
at least one processor communicatively coupled to the at least one camera and arranged to activate the camera to capture images while the upper lid is in the closed position.

19. The camera system of claim 18, including a reflector component having the reflector and walls with at least one opening to permit light to reach the reflector, wherein the reflector component is detachably mounted on the base.

20. The camera system of claim 18, wherein the reflector includes a substantially planar reflective surface.

21. The camera system of claim 18, wherein the reflector includes a prism formed of multiple reflective surfaces.

22. The camera system of claim 18, wherein the base includes a housing with walls forming at least one opening that is to permit light to reach the reflector.

23. The camera system of claim 18, wherein the computing device includes at least one image processing circuit communicatively coupled to the camera and arranged to perform image processing on images captured by the camera, wherein the images are captured by the camera while the upper lid is in the closed position and while the camera faces the base.

* * * * *